(No Model.) 2 Sheets—Sheet 1.

E. THOMSON.
ALTERNATING CURRENT MOTOR.

No. 430,328. Patented June 17, 1890.

Witnesses
Ira R. Steward
Wm. H. Capel

Inventor
Elihu Thomson.
By his Attorney
H. C. Townsend (No Model.)  2 Sheets—Sheet 2.

E. THOMSON.
ALTERNATING CURRENT MOTOR.

No. 430,328.  Patented June 17, 1890.

Witnesses
Ira R. Steward.
Wm H. Capel

Inventor
Elihu Thomson
By his Attorney
H. C. Townsend

UNITED STATES PATENT OFFICE.

ELIHU THOMSON, OF LYNN, MASSACHUSETTS.

ALTERNATING-CURRENT MOTOR.

SPECIFICATION forming part of Letters Patent No. 430,328, dated June 17, 1890.

Application filed January 19, 1889. Serial No. 296,904. (No model.)

*To all whom it may concern:*

Be it known that I, ELIHU THOMSON, a citizen of the United States, and a resident of Lynn, in the county of Essex and State of Massachusetts, have invented certain new and useful Motors and Distribution of Power, of which the following is a specification.

My present invention relates to a method of operating alternating-current electric motors in which the rotation is due to the reaction between an alternating-current field and an armature in which currents induced by said field flow in a circuit locally closed on itself. This class of motors when running at normal speed are capable of sustaining their speed of running in synchronism, or nearly synchronism, with the alternations of the feeding-wire, but are incapable of starting themselves.

My invention consists, broadly, in arranging the motor so that as a structure its armature will have different circuit arrangements at the start from those which will exist when it is up to speed or well started in rotation. To accomplish this the motor is started with the armature-circuits commuted or changed, so that the armature will receive an initial impulse or impulse of rotation, after which, when the desired speed has been obtained, the connections are so modified either automatically or at the will of the operator that the circuit of the motor-armature will be locally closed on itself and uncommuted.

Briefly, the invention consists in commencing to run the motor with a different circuit arrangement for its armature from that which it will have under its condition of steady normal working or running, such primary condition being one adapted to give a torque, that being continued for a sufficient time will bring the motor up to the speed where it may be run with the armature on continually-closed circuit.

Figure 1:
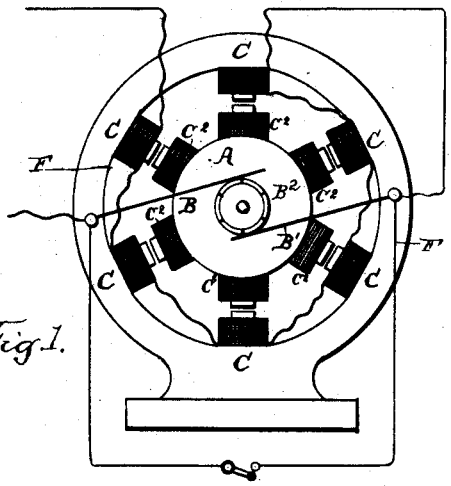
Figure 2:
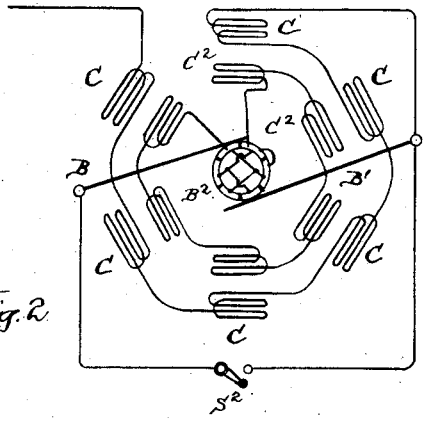
Figure 3:
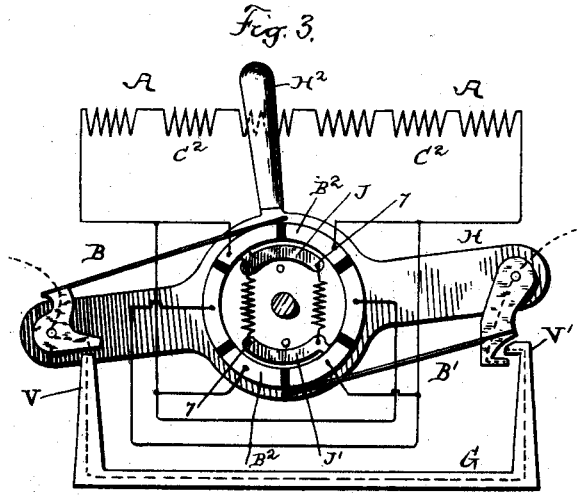
Figure 4:
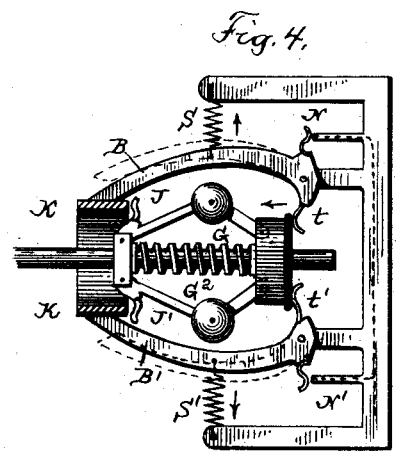
Figure 5:
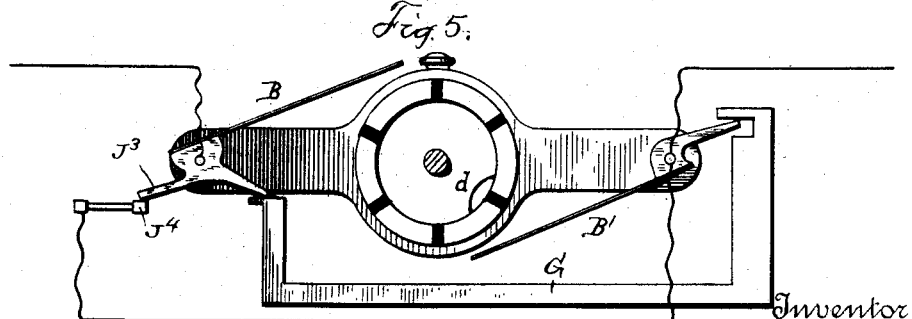
Figure 6:
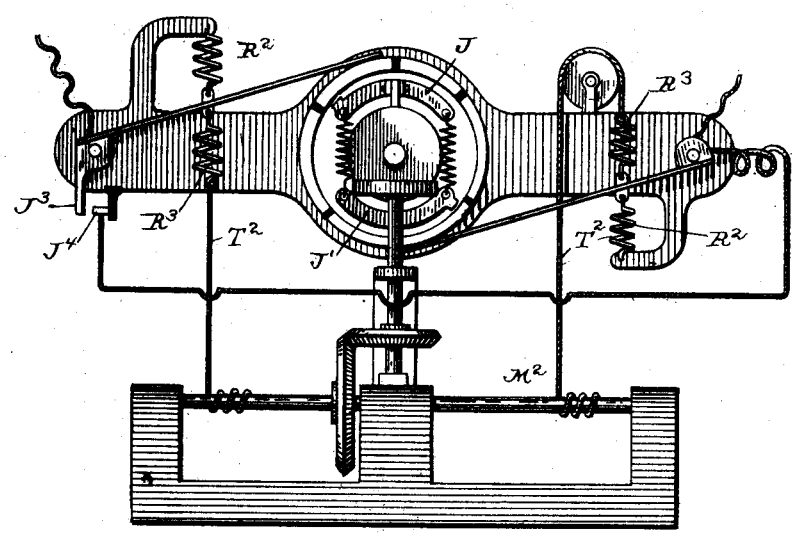
Figure 7:
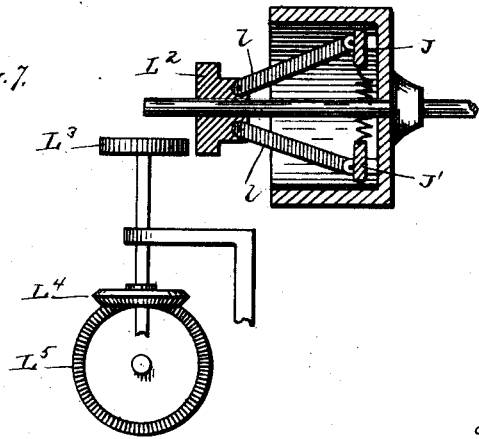

In the accompanying drawings, Figure 1 is a side elevation of a form of electric motor to the operation of which my invention may be applied. Fig. 2 is a diagram of the circuits and connections of the apparatus. Figs. 3, 4, and 5 are side elevations of modified forms of apparatus which may be used in practicing the invention. Fig. 6 is a side elevation of a further modification. Fig. 7 is a cross-section and end view of a part of the apparatus shown in Fig. 6.

In Fig. 1 let F F represent a field-magnet frame, preferably laminated, having projections upon which are wound coils C C C, &c., as many as six in number, which projections extend inwardly toward a revolving armature A, preferably laminated, having coils $C^2$—say six in number—wound on projections on its exterior, as usual, with certain types of dynamo or motor devices. Let there be placed upon the shaft of the machine a commutator $B^2$, consisting of six segments, each alternate segment being connected so that there are in reality but two divisions of three segments, each fitted together. The armature-coils are connected in any suitable fashion, so that their terminals are carried to the commutator-divisions, and so that if a continuous current were passed through the coils the projections on the armature would assume alternate north and south polarities. The field-coils are in like manner connected so that a current passed through them would give alternate north and south polarities to the projections. Now, if an alternating current be passed through the field-coils C C from any suitable source, as a transformer, the motor will not start to rotate whether its armature-circuit be practically open or whether the coils be on closed circuit; but it will continue to rotate in either direction if it is once started if the armature-coils are placed on closed circuit and the current fed to the coils C C be of sufficient amount of energy.

The condition under which the armature-coils are on closed or short circuit and carry currents induced by the field-magnet, while the latter is fed with alternating current, is the normal or working condition of the particular motor shown. Such a structure can readily be started into rotation by making use of a commutator upon which at determinate opposite points brushes B B' rest, the armature-terminals being kept separated and ending in the commutator-divisions, as described, so that each alternate segment is connected to one of the armature-terminals. In the motor shown the alternating current which passes through the field is made at the start to circulate through the armature by proper connection of the commutator-brushes to the circuit.

In the primary or initial condition of the motor the brushes of the commutator are set backward or forward into proper position, where the armature will begin to rotate. This rotary effect is due to the production of certain polarities in the field and armature projections, which latter are repelled from those poles on the field which they are leaving and attracted to those to which they are progressing, the impulses of the current passing in the armature being commuted to produce a repetition of this action as soon as the armature-poles have reached the attracting-poles or passed just beyond them into position where they shall be repelled in order to produce a continuance of the motion in the same direction. Under these conditions the motor begins to take speed and gradually rises in velocity if not under load or under light load. When a certain speed has been obtained, the motor is made to assume its normal working condition and to continue its rotation without the commutator by short-circuiting the armature by any desired means, as by short-circuiting the segments of the commutator and by closing the circuit across the commutator-brushes, so as to preserve the circuit for the alternating current through the field-coils, even removing the brushes, if desired, from the commutator. This condition is shown in the diagram Fig. 5, where the brushes B B' are uplifted and a connection is made from one segment of the commutator to another segment of the opposite polarity at $d$. Now the field-coils C C alone are in the alternating circuit, while the armature-coils are on closed circuit, the commutator being now virtually out of existence as such. These changes of condition may be made by devices manually operated; but I prefer to bring them about automatically by the operation of some device responsive to the change of speed of the armature and adjusted to bring devices which change or shift the apparatus or circuits into operation on the attainment of the predetermined speed which it is necessary that the motor should acquire before it can be left to take care of itself and to operate in its normal working condition.

The speed-responsive device may be conveniently constructed after the general plan of a centrifugal governor, and when the short-circuiting of the armature is produced by a piece J, Fig. 3, such piece may itself be the movable weight rotated by the armature and moved by centrifugal force.

In Fig. 3 I have shown how the short-circuiting of the armature may be produced by a device of this kind, the closing of the circuit for the field-coils around the armature and the removal of the brushes from the commutator being effected by hand. In other figures I have shown apparatus by which all the changes of condition are effected by a device in the nature of a centrifugal governor responsive to changes of speed. The devices could be indefinitely modified to accomplish the same result.

As indicated in Fig. 3, the contacts J are mounted on fixed pivots at 7, which are fixed upon some support—as, for instance, a part of the commutator—while their opposite ends are left free to fly out under centrifugal action and touch the commutator-segments opposite them. They are normally restrained from operation by springs applied as shown and adjusted to keep them out of contact with the segments until the speed reaches the desired point and the centrifugal force becomes so large as to overcome the tension of the springs. Suitable connection is made with the pivot or fixed point of J from a segment, as shown. When the pieces J fly outward, adjoining segments (shown in the diagram Fig. 2) connected to opposite terminals of the armature-coils are brought into electrical connection, thereby producing an automatic closure of the armature-circuit. The brushes B B are mounted in pivoted holders on a movable yoke-piece H, having a proper handle $H^2$. When the closure of the armature-circuit has been effected, the yoke may be quickly thrown by means of its handle to bring the pivoted brush-holders against the stationary stops V V', by which means the brushes are uplifted from contact with the commutator. If the stops V V' are electrically connected by the bar G, the action just described is accompanied by a closure of the circuit around the commutator-brushes, as indicated, thus preserving the circuit for the field-magnet coils in the same manner that it would be preserved by operating a switch, such as $S^2$, Fig. 2. By providing one of the brush-holders with a tail-piece $J^3$, as indicated in Fig. 5, adapted to make contact with a stop $J^4$, directly connected to the other brush-holder, the closure of circuit for the field-magnet coils might be effected independently of the stops which throw the brushes of the commutator.

Fig. 4 shows how a centrifugal governor may be made to produce both the short-circuiting of the armature or commutator and the lifting of the brushes, it being understood that the adjustments are such that the commutator is short-circuited just before the brushes are lifted. The governor G is provided with two contact-pieces J J', placed opposite the commutator-segments K K diametrically, so that on the flying out of the parts of the governor the spring conducting-pieces J J', which are electrically connected with one another and are supported on the governor-arms, are brought in contact with segments of the commutator connected, respectively, with the terminals of the armature-coil. At the same time or just a little after this has occurred the sleeve carried by the governor is relieved from contact with the spring-toes $t\ t'$, projecting from the brush-holders, so that the brushes B B' may be raised off the commutator K K by the springs S S' after the speed has risen to the desired point. At low speed the spring on the governor causes pressure to be exerted on the toes $t\ t'$, which forces the brushes B B' into contact with the commutator. It is to be understood that the brushes B B' are insulated when so pressed on the commutator, so that they may act to properly convey the currents. Their supports are therefore insulated, and all metal pieces which could possibly short-circuit them likewise insulated. When, however, they are permitted to rise from the commutator, they may come into contact with conducting-pieces, as N N', which short-circuit them at the moment of leaving the commutator or just before. This may be secured by making the pieces projecting from the brush-holder at N N', as well as the contact ends of the brushes themselves, springy or elastic. By the provision of the springs at J J' $t\ t'$ the centrifugal governor is permitted to continue its movement a slight distance after connection is effected at J J', so that such connection may be followed by a movement of the brushes B B', permitted as the head of the governor relieves the springs $t\ t'$.

In the modification shown in Figs. 6 and 7 the movable pieces J J', which correspond to the balls or weights of a centrifugal governor, effect the closure of the armature-circuit in the manner described in Fig. 3. They are connected by links $l\ l$ with a movable head $L^2$, which revolves with the commutator and has a driving-surface adapted at slow speed to engage with a friction-disk $L^3$, which in turn, through suitable gear $L^4\ L^5$, drives a shaft $M^2$. Springs $R^2\ R^2$, applied to the commutator-brushes, tend constantly to lift them off the commutator-cylinder. This tendency at the slow or initial speed of the armature and commutator is overcome by the springs $R^3\ R^3$, which are connected with and put under tension superior to that of the springs $R^2$ by means of the cords $T^2\ T^2$, that wind upon the shaft $M^2$. When the brushes are lifted off the commutator-cylinder, they are connected together electrically by means of the stop $J^4$, acting in conjunction with the brush-holder in the manner described in connection with Fig. 5. In the initial condition of the motor the brushes B B' bear on the commutator-cylinder, and the rotation of the armature is produced by the combined action of the field-magnet and the currents conveyed to the armature through the brushes. Until the proper speed is attained, when the connection through the armature may be broken and its coils put on short circuit, the rotating head $L^2$ remains in engagement with the wheel $L^3$, the springs which act on movable pieces J J' being set or adjusted so that until the critical or determinate speed is reached they will not be moved outward appreciably. While this condition continues therefore, the brushes are held in contact with the cylinder, because the head $L^2$ tends to wind up the cords $T^2\ T^2$ and put the springs $R^3\ R^3$ under tension. The moment, however, the speed reaches the point where the pieces J J' may move instantly outward to short-circuit the armature the head $L^2$ is drawn away by means of the links $l$ from the wheel $L^3$, and the springs $R^3$ being thereby relieved of tension the springs $R^2$ come into action to remove the brushes from the commutator-cylinder and to complete the connection around the armature in obvious manner.

The apparatus used and the structure herein described are the subject of a separate application for Letters Patent, the present application being confined to the method.

What I claim as my invention is—

1. The herein-described method of operating an alternating-current motor in which the rotation is produced by the reaction between the field and a locally-closed armature-circuit carrying currents induced from the field, consisting in organizing or connecting the motor-armature circuit so that it may receive an initial impulse of rotation, and upon the attainment of a predetermined speed changing or modifying such connections, so as to put the armature-coils on locally-closed circuit.

2. The herein-described method of operating alternating-current motors incapable of self-starting, consisting in connecting the armature-circuits in a manner different from that which they have during normal work, and in proper way to give the initial torque, and then automatically reorganizing the connections of such armature, so as to put the same on locally-closed circuit on the attainment of a predetermined speed.

3. The herein-described method of operating an electric motor incapable of self-starting, consisting in including the armature in an alternating-current circuit and cutting the armature-coils out of circuit at predetermined points in their revolution, so as to permit the armature to have an initial torque, and on the attainment of a predetermined critical speed disconnecting the armature from an alternating-current source and putting the armature-coils on locally-closed circuit.

4. The herein-described method of operating an alternating-current electric motor, consisting in feeding alternating currents to both the armature and field in order to bring the machine to the critical speed of rotation, and then cutting off the currents from the armature and putting it on locally-closed circuit, so that the currents flowing in it will be the induced currents only produced by the field.

Signed at Lynn, in the county of Essex and State of Massachusetts, this 17th day of January, A. D. 1889.

ELIHU THOMSON.

Witnesses:
J. W. GIBBONEY,
A. L. ROHRER.